Figure 1:
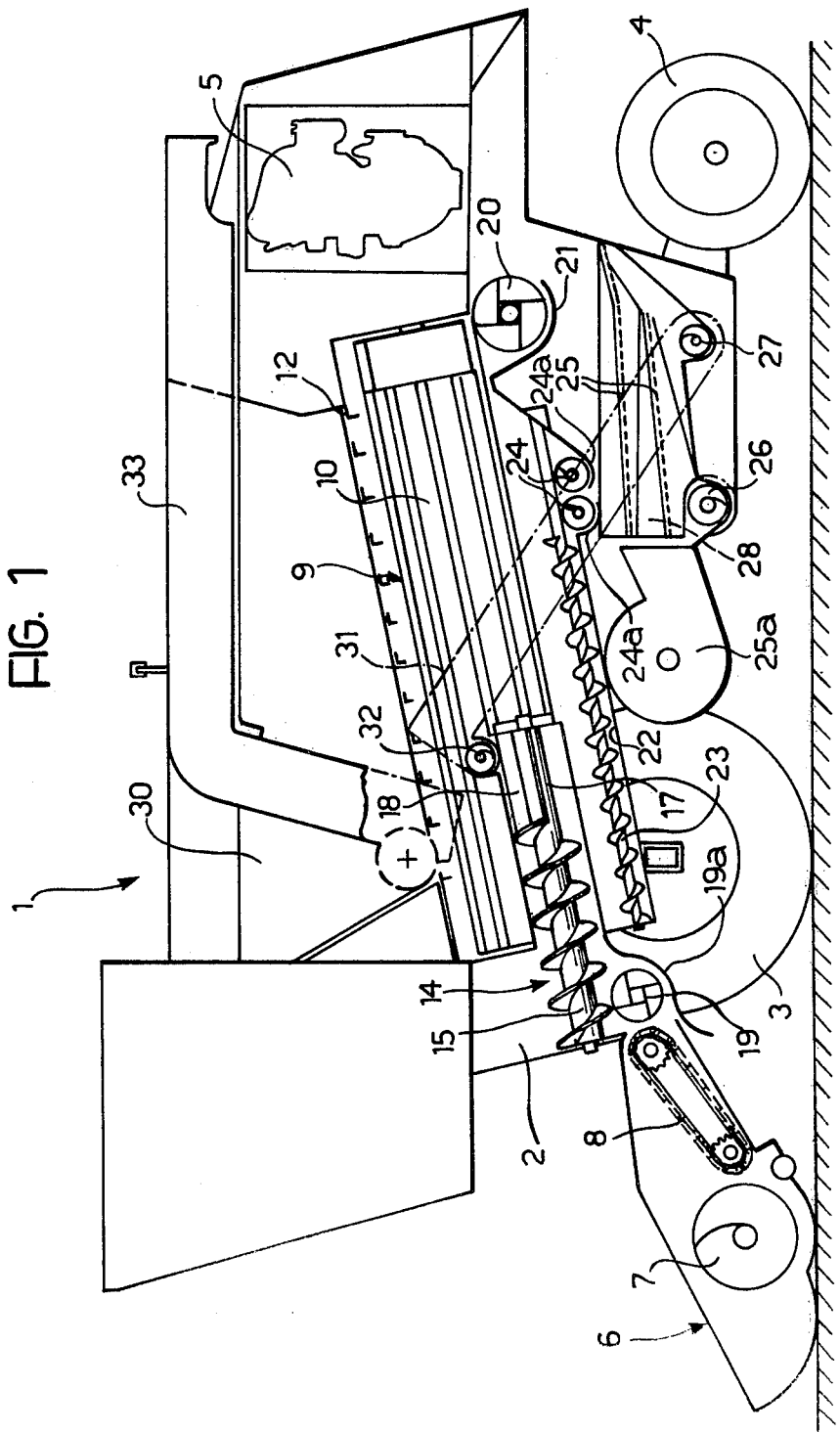

United States Patent [19]

Raineri

[11] 4,338,955

[45] Jul. 13, 1982

[54] COMBINE HARVESTER HAVING AN AXIAL-FLOW THRESHING AND SEPARATING UNIT

[75] Inventor: Giuseppe Raineri, Bassano del Grappa, Italy

[73] Assignee: Pietro Laverda S.p.A., Breganze, Italy

[21] Appl. No.: 262,880

[22] Filed: May 12, 1981

[30] Foreign Application Priority Data

Jun. 19, 1980 [IT] Italy ................................ 67960 A/80

[51] Int. Cl.³ ......................... A01F 7/06; A01F 12/10
[52] U.S. Cl. .............................. 130/27 AB; 130/27 R
[58] Field of Search .............. 130/27 R, 27 AB, 27 T, 130/27 AA; 56/14.6

[56] References Cited

U.S. PATENT DOCUMENTS

| 1,879,960 | 9/1932 | Thorn | 56/14.6 |
| 2,236,002 | 3/1941 | Lederer | 56/14.6 |
| 2,390,949 | 12/1945 | Krause et al. | 130/27 AB |
| 4,087,953 | 5/1978 | Wilson et al. | 130/27 T |

FOREIGN PATENT DOCUMENTS

| 1482219 | 5/1969 | Fed. Rep. of Germany | 56/14.6 |
| 2245603 | 4/1973 | Fed. Rep. of Germany | 130/27 T |
| 1484702 | 6/1967 | France | 56/14.6 |

*Primary Examiner*—Paul J. Hirsch
*Attorney, Agent, or Firm*—Sughrue, Mion, Zinn, Macpeak & Seas

[57] ABSTRACT

A combine harvester comprises an axial-flow threshing and separating unit which includes a threshing and separating cylinder disposed with its axis lying in a longitudinal vertical plane. The combine harvester is provided with means for feeding the harvested crop tangentially to the said axial-flow threshing and separating unit.

2 Claims, 3 Drawing Figures

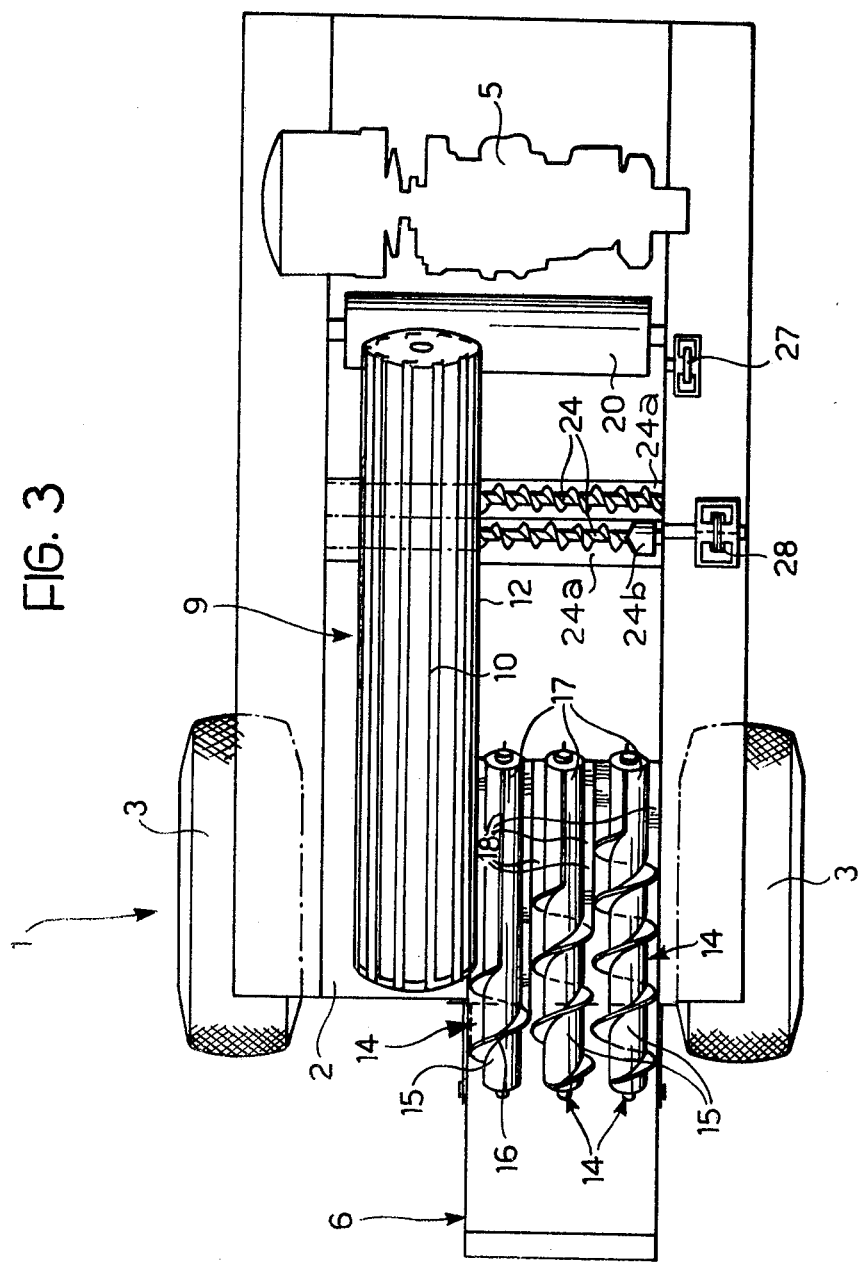

COMBINE HARVESTER HAVING AN AXIAL-FLOW THRESHING AND SEPARATING UNIT

This invention relates to combine harvesters.

In particular, the invention relates to a combine harvester comprising an axial-flow threshing and separating unit which includes a threshing and separating cylinder with an associated counter beater substantially in the shape of a concave grille, and a separator casing substantially in the form of a tubular body having at least one portion constituted by a grille; and means for feeding the harvested crop to the said axial-flow threshing and separating unit.

Combine harvesters of the type described above are known and have been used for some time. In such machines the harvested crop follows a helical trajectory around the threshing and separating cylinder, moving axially from one end of it to the other. In this way an efficient threshing action and better separation of the grain is achieved.

The threshing and separating cylinder can be arranged transversely or longitudinally in relation to the direction of travel of the machine. In the first case, the crop is usually fed tangentially to the cylinder at one end thereof. In the second case, on the other hand, the crop is fed axially to the cylinder in correspondence to one end thereof.

Tangential feed is preferable to axial feed, inasmuch as with the former, constant and regular intake of the harvested crop, of whatever kind it may be, is assured.

The object of this invention is to provide a combine harvester of the above-specified type having an axial-flow threshing and separating unit, the cylinder of which has its axis lying in a longitudinal vertical plane, wherein means are provided for feeding the crop tangentially to the aforesaid threshing and separating unit.

With a view to achieving this object, the present invention provides a combine harvester of the above-specified type in which the axis of the threshing and separating cylinder is arranged in a longitudinal vertical plane, the main characteristic of which is that the threshing and separating unit has a crop input opening arranged on one side adjacent to its front end, and that the aforesaid feed means comprise a series of feed cylinders disposed side-by-side adjacent said input opening with their axes parallel to the axis of the threshing and separating cylinder and lying in a plane perpendicular to the longitudinal vertical plane, each feed cylinder having a first portion, in the form of an auger, adjacent its front end, and a second portion, adjacent its rear end, provided with a series of radial blades on its outer surface; the axial length of the said first portion being progressively greater for the feed cylinders the further away they are from the input opening of the axial-flow threshing and separating unit.

Due to the aforesaid characteristic, the stalks of the harvested crop supplied to the feed cylinders in a longitudinal direction undergo, under the action of the latter, a re-direction of about 90° and are fed tangentially to the threshing and separating unit.

In this manner it is possible to obtain the characteristic advantages of tangential feed with a threshing and separating unit arranged longitudinally in relation to the direction of travel of the machine.

Figure 2:
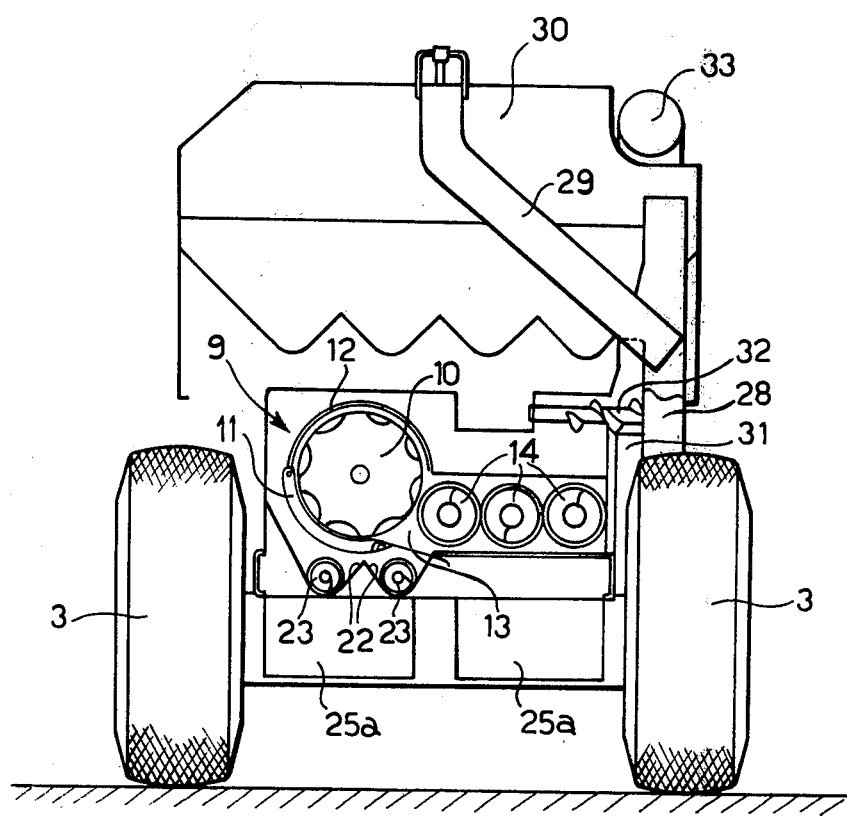

Further characteristics and advantages of this invention will emerge from the following description with reference to the accompanying drawings which are supplied purely by way of non-restrictive example, in which:

FIGS. 1, 2 and 3 are, respectively, a side view, a front view and a plan view of a combine harvester according to this invention.

In the drawings, by 1 there is indicated in its entirety a combine harvester comprising a chassis 2 mounted on front wheels 3 and rear wheels 4, and having an internal combustion engine 5.

At its front end the combine harvester 1 is provided with a cutting platform 6 of the conventional kind, including a feed auger 7 and a chain elevator 8.

On one side of the combine harvester is disposed an axial-flow threshing and separating unit, indicated in its entirety by reference numeral 9, which comprises, in known manner, a threshing and separating cylinder 10, a counter-beater 11 (see FIG. 2) substantially in the form of a concave grille surrounding, below, a portion of the threshing and separating cylinder 10, and a separator casing 12, shaped substantially as a tubular body, and constituted on its underside by a grille having an angular extent of about 200°.

In the particular example illustrated, the threshing and separating cylinder 10 is arranged with its axis lying in a longitudinal vertical plane in relation to the direction of travel of the machine, and inclined upwardly to the rear.

At one side of the axial-flow threshing and separating unit 9, and adjacent its front end, there is disposed an input opening 13 (see FIG. 2) for the input of the harvested crop into the space enclosed between the cylinder 10 and the counter-beater 11.

Adjacent to the input opening 13 there are disposed three feed cylinders 14 arranged, side-by-side, with their axes parallel to the axis of the cylinder 10 and lying in a plane perpendicular to a longitudinal vertical plane. Each cylinder 14 comprises a first portion 15, in the form of an auger, adjacent to its front end, and a second portion 17, adjacent to the rear end of the cylinder, which has on its outer surface a series of radial blades 18.

The three feed cylinders 14 are driven so that all three rotate in the clockwise direction as viewed in FIG. 2.

Below the cylinders 14, and adjacent their front ends, there is disposed a bladed transverse drum 19 which feeds the crop coming from the elevator 8 to the cylinders 14.

A table 19a is situated below the drum 19 and cylinders 14 and is arranged to swing on flexible support means of a known kind (not illustrated).

A bladed discharge drum 20 is disposed at the outlet of the threshing and separating unit 9 for discharging straw leaving the unit 9 onto the ground. A plate metal grille 21 is arranged below the drum 20.

Below the threshing unit 9 there are disposed two longitudinal collector channels 22 (see FIG. 2) within which are located two augers 23 arranged to feed the separated crop to a pair of counter-rotating transverse augers 24. Referring to FIG. 1, the auger 24 on the left rotates anti-clockwise, and that on the right, clockwise. Each auger 24 is surrounded below by a channel wall 24a; furthermore, each auger 24 is provided at its discharge end with a paddle 24b. The two paddles 24b (one of which can be seen in FIG. 3) are located at ends of the augers 24 which are opposite each other.

Below the auger 24 there is disposed a cleaning unit of the conventional kind, comprising a pair of riddling screens 25 located one above the other and associated with a pair of fans 25a arranged to blast with an upcurrent of air the grain which is caused to fall onto the screens 25 from the transverse augers 24, a pair of conveyors 26 for the cleaned grain, and a screw-conveyor tailings for the crop 27.

The auger 26 is associated with a blade elevator of a known kind (illustrated diagrammatically in FIG. 2, and indicated by reference number 28) with which there is associated a screw conveyor 29 for conveying the cleaned grain to a reservoir tank 30 which is provided on the combine harvester.

The tailings screw-conveyor 27 on the other hand, is associated with a blade elevator, also of a known kind, shown diagrammatically by a dash and dot line in FIG. 1, and indicated by the reference number 31.

The output end of the conveyor 31 feeds a transverse auger 32 (see FIG. 2) which causes the tailings to fall onto the feed cylinders 14.

The combine harvester is also provided with a directionally-controlled conveyor mechanism 33 for offloading the grain from the tank 30.

One important characteristic of the combine harvester according to this invention is that the axial length of the auger portion 15 of each feed cylinder 14 is progressively greater for the cylinders more distant from the input opening 12 of the threshing and separating unit.

Operation of the combine harvester described above is as follows:

The harvested crop is fed from the elevator 8 to the transverse drum 19, and thence to the feed cylinders 14.

By the action of the auger portions 15 and of the portions 17, fitted with radial blades, of the cylinders 14, the crop, which is fed longitudinally to the cylinders 14, undergoes a 90° deviation and is fed tangentially to the threshing and separating unit, this action being particularly facilitated by the fact that the length of the auger portion 15 is made progressively greater for the cylinders furthest away from the input opening of the threshing and separating unit.

Once it has entered the threshing and separating unit 9, the harvested crop undergoes the operation of threshing and separating in a manner standard to this kind of mechanism. That is, the crop follows a helical trajectory around the cylinder 10, moving axially from one end of the latter to the other.

The grain separated during this phase is collected below in the channels 22 and conveyed by the two longitudinal augers 23 to the transverse counter-rotating augers 24. Referring to FIG. 3, the grain which is disposed in the region of the left hand auger 24, is conveyed towards the corresponding paddle 24b and thrust thereby against the wall of the channel 24a in which the right hand auger 24 resides. This latter thrusts the grain towards the corresponding paddle 24b which pushes it onto the left hand auger again, and so on. Thus there is created an anti-clockwise circulation (with reference to FIG. 3) of the grain, which, in the course of this movement falls onto the cleaning screens 25, passing between the two walls 24a. These walls 24a are fixed to support means (not illustrated) designed to allow adjustment of the distance between them.

The straw reaches the discharge end of the unit 9 and is offloaded onto the ground by the action of the discharge drum 20.

The grain discharged from the transverse augers 24 falls onto the cleaning screens 25 and meets with the rising current of air generated by the fans 25a.

In this manner, the chaff is subsequently separated from the grain, and discharged onto the ground.

The cleaned grain which is received from the auger 26 is conveyed via the elevator 28 and the conveyor 29 to the tank 30, whilst the tailings collected from the auger 27 are put back into circulation by the conveyor 31.

I claim:

1. In a combine harvester including:
an axial-flow threshing and separating unit comprising a threshing and separating cylinder disposed with its axis lying in a vertical plane extending longitudinally of the combine harverster, a counter-beater associated with said cylinder and in the shape of a concave grille, and a separator casing, substantially in the shape of a tubular body, having at least one portion constituted by a grille; and
means for feeding the harvested crop to said threshing and separating unit;
the improvement wherein the said threshing and separating unit is formed with a crop input opening arranged on one side thereof adjacent to its front end, and the said feed means comprises a series of feed cylinders arranged side-by-side, adjacent the said input opening, with their axes parallel to said longitudinal vertical plane, each of said feed cylinders having a first portion in the form of an auger, adjacent its front end, and a second portion adjacent its rear end, provided with at least one series of radial blades on its outer surface, the axial length of the said first portion being progressively greater for the feed cylinders the further away they are from said input opening of the axial-flow threshing and separating unit.

2. A combine harvester according to claim 1, wherein there is provided a feed drum disposed upstream of said feed cylinders and transverse to said longitudinal plane.

* * * * *